April 18, 1950

J. H. TILLOTSON 2,504,760

AXIALLY SHIFTING TYPE ADJUSTABLE
TIRE REMOVING MACHINE

Filed Dec. 17, 1946

4 Sheets-Sheet 1

Inventor
J.H. TILLOTSON

By
Attorney

April 18, 1950     J. H. TILLOTSON     2,504,760
AXIALLY SHIFTING TYPE ADJUSTABLE
TIRE REMOVING MACHINE Filed Dec. 17, 1946     4 Sheets-Sheet 2

FIG. 12.ᴬ

Inventor
J. H. TILLOTSON

By B. M. Whitburne

Attorney

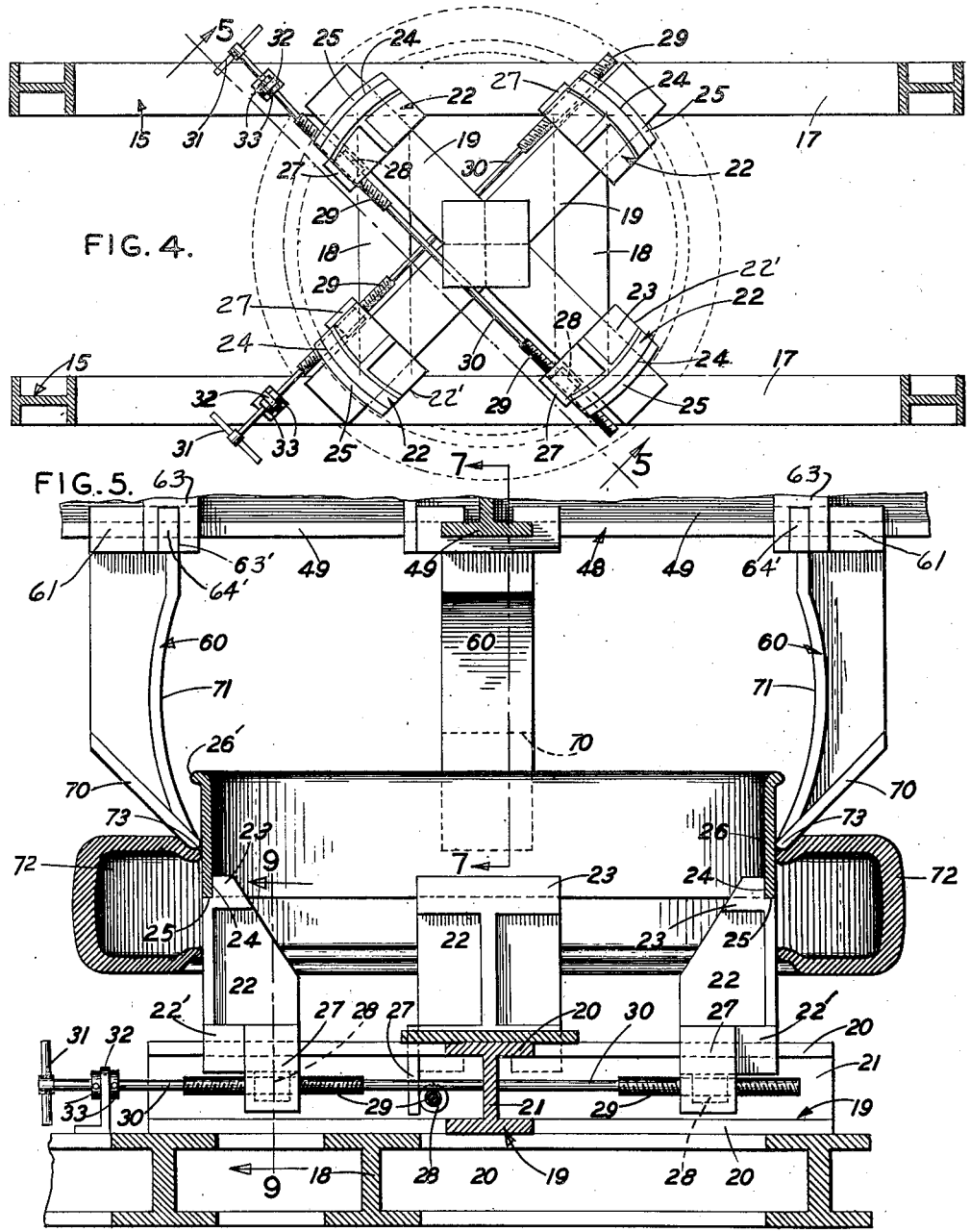

April 18, 1950 — J. H. TILLOTSON — 2,504,760
AXIALLY SHIFTING TYPE ADJUSTABLE
TIRE REMOVING MACHINE
Filed Dec. 17, 1946 — 4 Sheets-Sheet 4
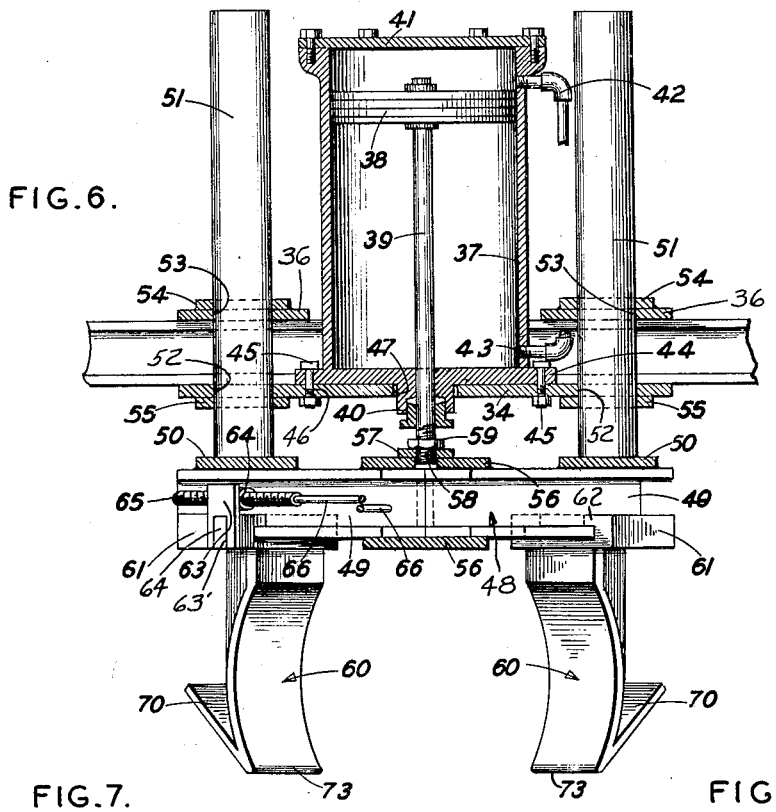
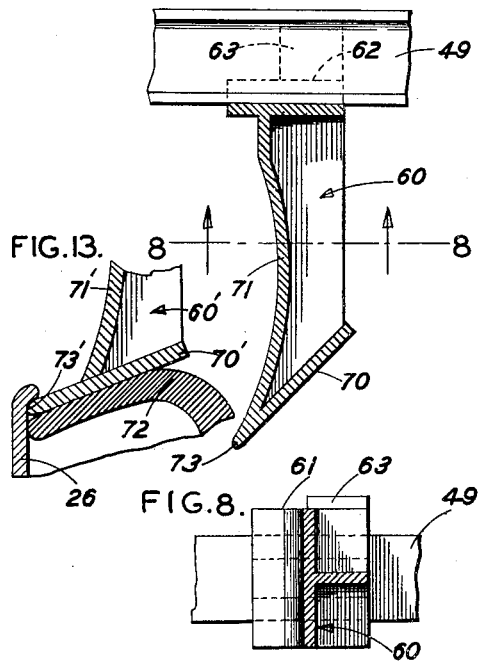
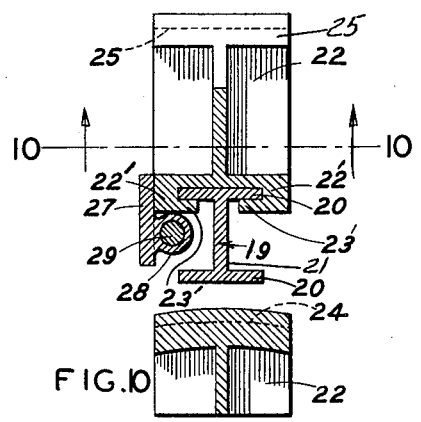
Inventor
J. H. TILLOTSON
By B. M. Kleberg
Attorney Patented Apr. 18, 1950

2,504,760

UNITED STATES PATENT OFFICE 2,504,760

AXIALLY SHIFTING TYPE ADJUSTABLE TIRE REMOVING MACHINE

James H. Tillotson, Spartanburg, S. C.

Application December 17, 1946, Serial No. 716,728

3 Claims. (Cl. 157—1.2)

My invention relates to a machine for removing tires or casings from rims.

An important object of my invention is to provide a machine of the above mentioned character, which is particularly adapted for removing the casings from the rims of heavy trucks, buses, and the like.

A further object of the invention is to provide a tire removing machine which is adjustable for operating on tires and rims of different sizes.

A further object of the invention is to provide a machine of the above mentioned character which is operated by fluid pressure for removing the tire from the rim.

A still further object of my invention is to provide a machine for removing tires which is simplified in design, extremely strong and durable, and which may be conveniently operated by a single attendant.

Other objects and advantages of the invention will be apparent during the course of the following description.

Figure 1:
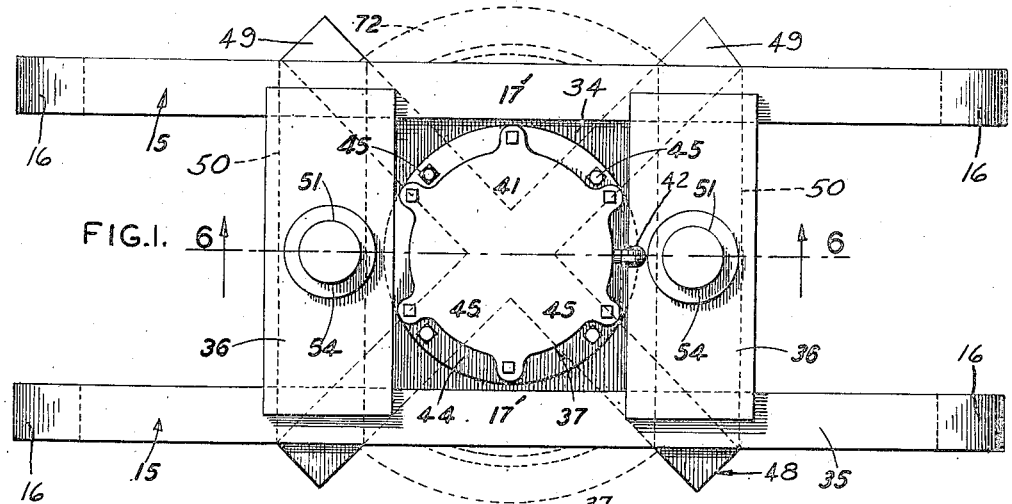
Figure 2:
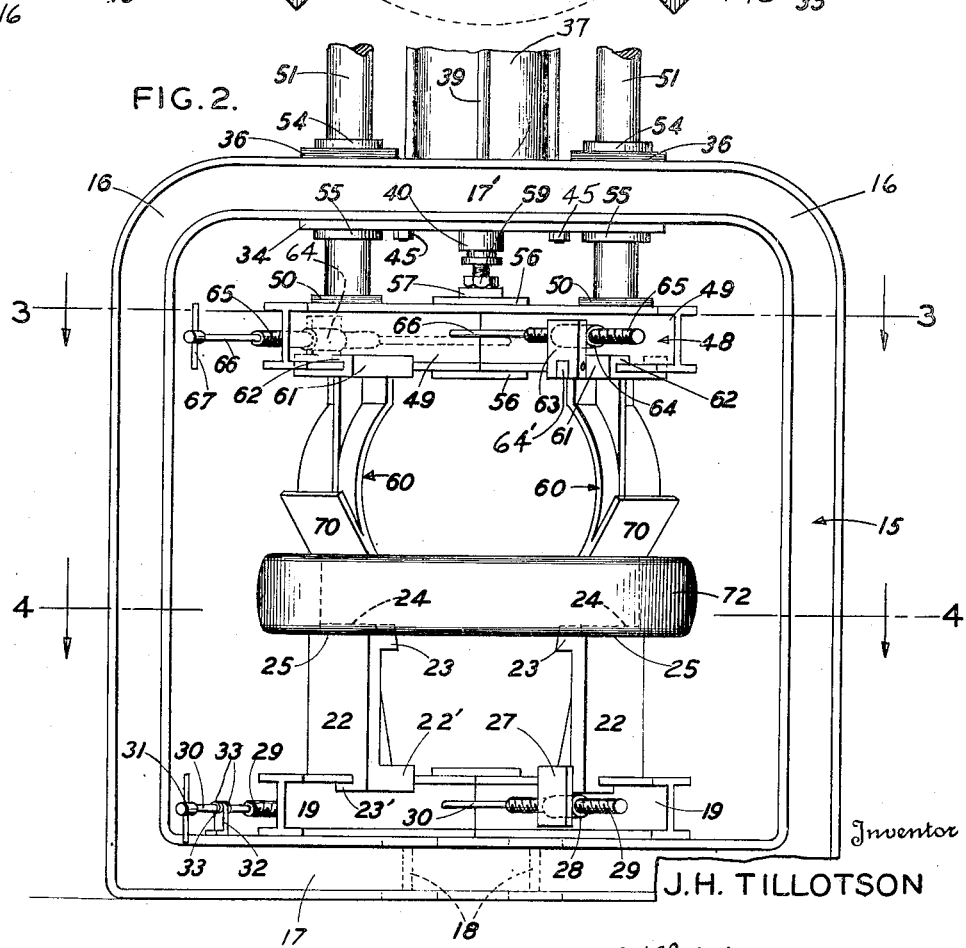
Figure 3:
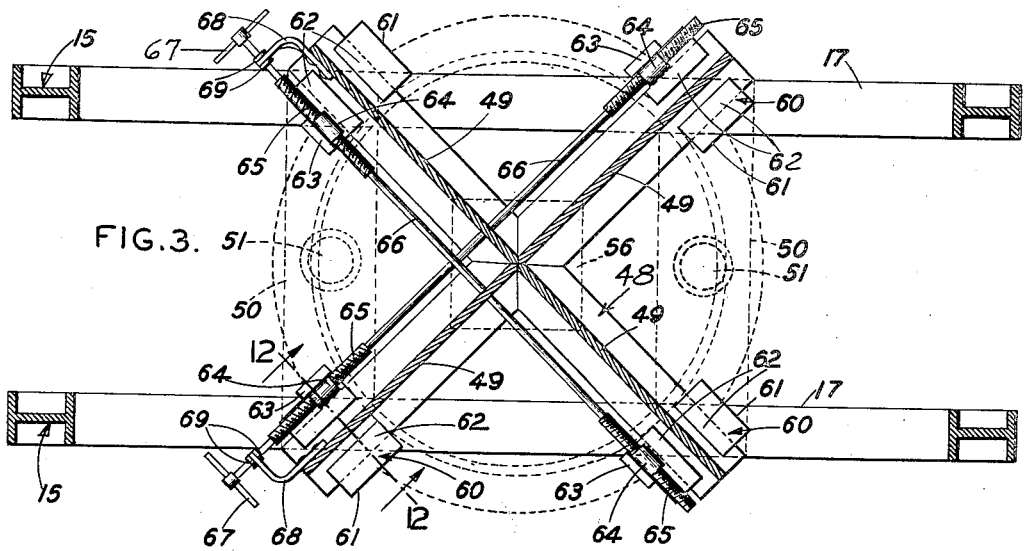
Figure 11:
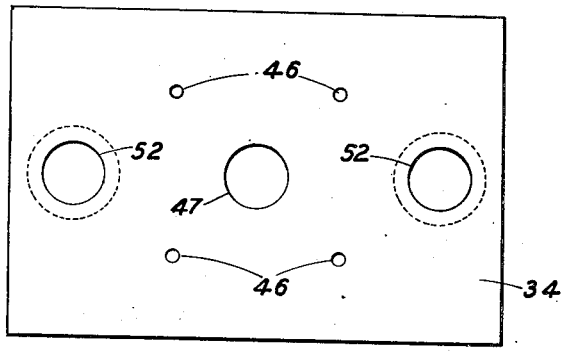
Figure 12:
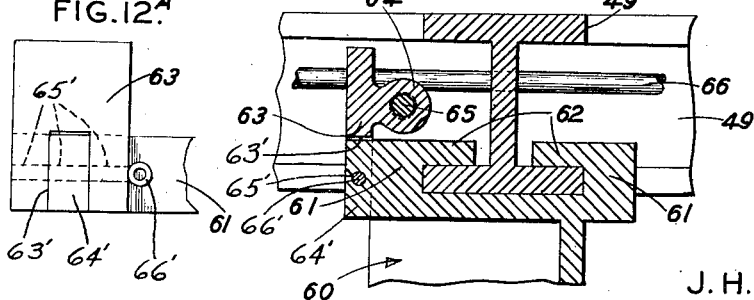

In the accompanying drawings, forming a part of this application, and in which like numerals are employed to designate like parts throughout the same, Figure 1 is a plan view of the tire removing machine embodying my invention, Figure 2 is a side elevation of the same, parts broken away, Figure 3 is a horizontal section taken on line 3—3 of Figure 2, Figure 4 is a horizontal section taken on line 4—4 of Figure 2, Figure 5 is an enlarged vertical section taken on line 5—5 of Figure 4, parts broken away, Figure 6 is a fragmentary vertical section taken on line 6—6 of Figure 1, Figure 7 is a vertical detail section taken on line 7—7 of Figure 5, Figure 8 is a horizontal section taken on line 8—8 of Figure 7, Figure 9 is a vertical detail section taken on line 9—9 of Figure 5, Figure 10 is a horizontal section taken on line 10—10 of Figure 9, Figure 11 is a plan view of a main plate, and, Figure 12 is a fragmentary vertical section taken on line 12—12 of Figure 3, and, Figure 13 is a fragmentary vertical section through a slightly modified form of casing engaging head.

In the drawings, where for the purpose of illustration, is shown a preferred embodiment of my invention, the numeral 15 designates a pair of vertical rectangular frame members, which are curved at their upper corners as shown at 16. The frame members 15 include lower or bottom horizontal rails 17, and top horizontal rails 17'. The frame members 15 are connected near their longitudinal centers with transverse horizontal rails 18, by means of welding, or the like. The top surfaces of the rails 17 and 18 are flush. The rectangular frame members 15 are preferably castings. The numeral 19 designates diagonal track rails, arranged at right angles to each other, and rigidly connected at their inner ends. These track rails 19 are rigidly mounted upon the rails 17 and 18, by means of welding, or the like. The track rails 19 are preferably I-sections, having the usual horizontal flanges 20 and a vertical web 21. Opposed pairs of rim engaging heads 22 are slidably mounted upon the track rails 19. These heads 22 include depending side extensions 22', carrying inwardly projecting portions or fingers 23', which engage beneath the upper horizontal flanges 20 of the track rails 19, see Figure 9. The heads 22 are provided at their tops with rests 23, having outer circularly curved recesses 24, and circularly curved horizontal shoulders or stops 25 at the bottom of these recesses. The recesses 24 receive the edge of a rim 26, after the conventional removable bead has been separated from the rim. The rim 26 also has an integral bead 26'. Means are provided to shift the heads 22 in each opposed pair radially in opposite directions simultaneously, comprising depending ears or plates 27 welded to the side extensions 22', and carrying screw-threaded rings or nuts 28, rigidly secured thereto. The screw threaded nuts 28 receive the screw threaded portions 29 of horizontal shafts 30, turned by cranks or handles 31, or the like. The screw threaded portions 29 of each shaft 30 are right and left hand screw threaded, so that the heads 22 in each opposed pair move in or out radially, when the shafts 30 are turned in the proper direction.

Each shaft 30 is held against end or axial movement by brackets 32, which are rigidly mounted upon the rails 17, adjacent to the shafts 30. The upper ends of the brackets 32 have openings which rotatably receive the shafts 30, and these upper ends engage between collars 33 rigidly secured to the shafts.

Near the top of the frames 15 there is a main horizontal plate 34, arranged beneath the top rails 17' and rigidly secured thereto by means of welding and the like. Arranged above the top rails 17', are upper transverse spaced horizontal plates 36, welded to the top rails 17'. A vertical cylinder 37 is provided, positioned between the top rails 17' and the upper plates 36. The cylinder 37 has a plunger 38 therein, connected with a plunger rod 39, extending to the exterior of the cylinder, at its bottom, through a packing gland 40, or the like. The cylinder 37 has a removable cover 41, and is provided with air inlet-exhaust pipes 42 and 43, located near upper and lower ends of the cylinder. The cylinder 37 is provided at its lower end with a circular horizontal flange 44, which is secured upon the main horizontal plate 34 by bolts 45, passing through openings 46 in the plate. The plunger rod 39 and packing gland 40 extend through a central opening 47 in the main plate 34.

The numeral 48 designates a vertically movable carriage, including diagonal track beams 49, arranged at right angles to each other, and rigidly connected at their inner ends by means of welding, or the like. The track beams 49 are preferably I-sections, having the usual upper and lower horizontal flanges and a vertical web. The outer ends of the track beams 49 are rigidly connected by horizontal strips or plates 50, which are welded to the beams 49. These plates 50 are rigidly secured to the lower ends of vertical guide rods or posts 51, which are slidable in openings 52 formed in the main plate 34, and in openings 53 formed in the plates 36. The plates 36 have reinforcing guide rings 54 welded thereon, to serve as additional guides for the posts 51. Similar rings 55 are welded to the lower sides of the main plate 34, to further guide the posts 51 as they move vertically. The carriage 48 has central rectangular reinforcing plates 56 rigidly mounted upon its upper and lower surfaces, and the upper reinforcing plate 56 carries a central screw threaded nut 57 welded thereto. This screw threaded nut 57 receives the screw threaded end 58 of the plunger rod 39. A lock nut 59 is provided to prevent the plunger rod 39 from turning after it is within the nut 57. It is thus seen that the plunger 38 is positively connected with the vertically movable carriage 48, to raise and lower the carriage. A fluid under pressure, preferably compressed air from any suitable source, is introduced into either end of the cylinder 37, through either of the inlet-exhaust pipes 42 or 43, to raise and lower the plunger. A suitable valve is provided for supplying compressed air through either pipe, while exhausting air through the other pipe. It is thus seen that the plunger 38 is pressure actuated in either direction, for raising or lowering the carriage 48.

Slidable upon the track beams 49 are radially adjustable opposed pairs of casing engaging heads 60. These heads 60 are preferably T-sections, as viewed in horizontal cross-section, see Figure 8. Each head 60 includes upper vertical extensions or side plates 61, carrying inwardly extending horizontal fingers 62, which engage above the lower horizontal flange of the associated track beam 49, to suspend the head 60 therefrom. The heads 60 in each opposed pair are adjusted radially in or out by similar means to those shown and described in connection with the rim engaging heads 22. For this purpose upstanding ears or plates 63 are detachably secured to the side extensions 61, and are provided upon their inner faces with screw threaded nuts 64. The plate 63 has an opening 63', to receive a lug 64', integral with the side plate 61. The parts 63 and 64' have openings 65' to receive a pin 66'. The screw threaded nuts 64 receive the screw threaded portions 65 of shaft 66. The screw threaded portions 65 of each shaft 66 are right and left hand screw threaded, and each shaft has a crank or handle 67 at one end. Brackets 68 are mounted upon the vertical webs of the track beams 49, and these brackets have openings to rotatably receive the shafts 66. The brackets engage against fixed collars 69 on the shafts 66 and hold the shafts against axial movement.

At their lower ends, the tire engaging heads 60 carry inclined plates or shoes 70, which project inwardly beyond the bead 26' of the rim 26, and the heads 60 are provided with recesses 71 to provide clearance for the bead 26', see Figure 5. After the shoes 70 have cleared the rim flange 26', the heads 60 are adjusted inwardly so that the inner edges of the shoes 70 are arranged close to the outer periphery of the rim 26 and moved vertically downwardly to strip the tire or casing 72 from the rim 26. The lower inner edges of the inclined shoes 70 are rounded, as shown at 73, to prevent damage to the casing 72.

The operation of the machine is as follows:

The carriage 48 is moved to its uppermost position, by manipulation of the control valve (not shown). The rim engaging heads 22 are adjusted radially, by turning the handles 31, and the tire or casing 72 with its rim 26 are placed upon the heads 22. The lower edge of the rim enters the circularly curved recesses 24, and it is seated upon the horizontal circularly curved shoulders 25. The heads 22 may be adjusted into tight clamping engagement outwardly against the inner surface of the rim, if desired. The tire or casing engaging heads 60 are now adjusted radially outwardly, by means of the handles 67, to such an extent that the inner rounded ends 73 of the shoes 70 will clear the bead 26' when the carriage 48 is moved downwardly. The carriage is now moved downwardly, by further manipulation of the control valve (not shown), and the lower ends 73 pass by the bead 26' and engage upon the casing 72. As the carriage descends the shoes 70 begin to strip the casing 72 from the rim, and when the lower ends 73 are slightly below the bead 26', the heads 60 may be adjusted further inwardly, so that the ends 73 come into close spaced relation with the outer periphery of the rim 26. The carriage 48 is now caused to descend further, and the shoes 70 will strip the casing 72 from the rim 26. The inclination of the shoes 70, and also the rounding of the lower ends 73 facilitate the stripping of the casing from the rim. When the casing is completely stripped or removed from the rim, the heads 60 are adjusted radially outwardly, and the carriage 48 is elevated to an upper position. The rim 26 and the casing 72 may now be conveniently removed from the machine.

In Figure 13 I have shown a modified form of casing engaging head 60', corresponding to the head 60, Figure 7. This head 60', Figure 13 has a recess 71', and shoe 70', having a free end 73'. The shoe 70' approaches the horizontal more than shoe 70.

It is to be understood that the forms of my invention herewith shown and described are to be taken as preferred examples of the same, and that various changes in the shape, size, and arrangement of parts may be resorted to without departing from the spirit of my invention or the scope of the subjoined claims.

Having thus described my invention, what I claim is:

1. A machine for removing tires from rims, comprising a substantially vertical frame, a horizontal group of heads mounted upon the lower portion of the frame and having jaws to engage the rim, a vertically movable carriage arranged within the upper portion of the frame, and including radial rails, pairs of adjustable carriages mounted upon the rails, a substantially vertical depending tire-engaging element rigidly mounted upon each adjustable carriage and provided at its lower ends with an inclined face to engage with the tire, an apertured lug rigidly secured to each adjustable carriage, a plate arranged near each adjustable carriage and having an opening formed therein to removably receive the lug and forming spaced apertured parts, a pin passing through the aperture of each lug and the apertures of the companion parts for detachably securing the plate to its adjustable carriage, nuts rigidly secured to the plates, a rod for coaction with each pair of adjustable carriages and having right and left screw threaded portions to engage with the nuts adjacent the pair of carriages, and means to hold the rod against longitudinal movement.

2. A machine for removing tires from rims, comprising a substantially vertical frame, a horizontal group of heads mounted upon the lower portion of the frame, and having jaws to engage the rim, a vertically movable carriage arranged within the upper portion of the frame and including radial rails, pairs of adjustable carriages mounted upon the rails, a substantially vertical depending tire-engaging element rigidly mounted upon each adjustable carriage and provided at its lower end with an inclined face to engage with the tire, and an apertured lug rigidly secured to each adjustable carriage and arranged upon the outer vertical face of the same, a vertical plate arranged adjacent to the outer vertical face of each adjustable carriage and having an opening formed therein to receive the lug and forming apertured parts, a pin passing through the aperture of each lug and the apertures of the companion parts for detachably securing the plate to the corresponding adjustable carriage, a nut arranged above each adjustable carriage, and upon the inner face of the vertical plate and rigidly secured to such inner face, a rod for coaction with each pair of adjustable carriages and have right and left screw threaded portions to engage with the nuts adjacent to each pair of carraiges.

3. A machine for removing tires from rims, comprising a substantially vertical frame, a horizontal group of heads mounted upon the lower portion of the frame and having jaws to engage the rim, a vertically movable carriage arranged within the upper portion of the frame and including radial rails, a pair of carriages mounted upon each rail to move longitudinally thereof, a tire engaging element mounted upon each movable carriage, an operating rod mounted upon each rail and extending longitudinally of the rail and provided with right and left screw threaded portions, nuts engaging the right and left screw threaded portions of each rod, and means detachably connecting the nuts with the carriages in each pair so that such carriages may be disconnected from the nuts to be quickly moved longitudinally upon the rail.

JAMES H. TILLOTSON.

REFERENCES CITED

The following references are of record in the file of this patent:

UNITED STATES PATENTS

| Number | Name | Date |
|---|---|---|
| 601,088 | Verel | Mar. 22, 1898 |
| 1,316,390 | Rischard | Sept. 16, 1919 |
| 1,564,496 | Staugaard | Dec. 8, 1925 |
| 1,758,264 | Senger | May 13, 1930 |
| 2,375,956 | Smith et al. | May 15, 1945 |
| 2,387,839 | Frost | Oct. 30, 1945 |
| 2,416,195 | Mitchell | Feb. 18, 1947 |
| 2,423,652 | Kelley | July 8, 1947 |
| 2,479,432 | Tillotson | Aug. 16, 1949 |

FOREIGN PATENTS

| Number | Country | Date |
|---|---|---|
| 378,277 | Great Britain | Aug. 11, 1932 |